United States Patent [19]

Baty

[11] Patent Number: 4,920,540

[45] Date of Patent: Apr. 24, 1990

[54] FAULT-TOLERANT DIGITAL TIMING APPARATUS AND METHOD

[75] Inventor: Kurt F. Baty, Medway, Mass.

[73] Assignee: Stratus Computer, Inc., Marlboro, Mass.

[21] Appl. No.: 18,629

[22] Filed: Feb. 25, 1987

[51] Int. Cl.$^5$ .................... G06F 1/04; G06F 11/20; H04Q 3/54

[52] U.S. Cl. .......................................... 371/61; 371/4; 371/47.1; 371/65

[58] Field of Search ................ 364/200 MS File, 900; 371/61, 8; 307/219

[56] References Cited

U.S. PATENT DOCUMENTS

| | | | |
|---|---|---|---|
| 3,900,741 | 8/1975 | Fletcher et al. | 307/219 |
| 4,019,143 | 4/1977 | Fallon et al. | 307/219 |
| 4,025,874 | 5/1977 | Abbey | 307/219 |
| 4,144,448 | 3/1979 | Pisciotta et al. | 371/61 |
| 4,156,200 | 5/1979 | Gomez | 307/219 |
| 4,185,245 | 1/1980 | Fellinger et al. | 307/219 |
| 4,239,982 | 12/1980 | Smith et al. | 307/219 |
| 4,322,580 | 3/1982 | Khan et al. | 371/8 |
| 4,453,215 | 6/1984 | Reid | 364/200 |
| 4,480,198 | 10/1984 | Gass | 307/219 |
| 4,538,272 | 8/1985 | Edwards et al. | 371/8 |
| 4,653,054 | 3/1987 | Liu et al. | 371/8 |
| 4,686,677 | 8/1987 | Flora | 371/61 |
| 4,691,126 | 9/1987 | Splett et al. | 307/219 |
| 4,800,564 | 1/1989 | De Fazio et al. | 371/61 |

FOREIGN PATENT DOCUMENTS

| | | | |
|---|---|---|---|
| 2360450 | 6/1975 | Fed. Rep. of Germany | 307/ |
| 0073532 | 5/1982 | Japan | 377/56 |

OTHER PUBLICATIONS

Hefferman et al., "Missing Clock Pulse Detector", IBM TDB, vol. 5, No. 1, Jun./62, p.76.

Sworakowski, "Redundant Clock Magnetic Recording", IBM TDB, vol. 12, No. 2, Jul./69, p. 254.

IBM Technical Bulletin, "Fail-Safe Clock Generation by Majority Logic", vol. 27, No. 4B, Sep./84, pp. 2640-2641.

IBM Technical Bulletin, "Checking Digital System Clock Pulses", vol. 11, No. 3, Aug./68, pp. 257-258.

IBM Technical Bulletin, "Clock/Synch Failure Detector Apparatus", vol. 22, No. 4, Sep./79, pp. 1495-1496.

IBM Technical Bulletin, "Missing Clock Detector", vol. 19, No. 5, Oct./76, pp. 1905-1906.

IBM Technical Bulletin, "Synchronized Clocking System", vol. 19, No. 5, Oct./76, pp. 1900-1901.

Standard Microsystems Corporation Technical Bulletin, "Floppy Disk Data Separator FDDS," 1982.

IBM Research, C. D. Cullum, "A Survey of Encoding and Signal Processing Techniques for Digital Magnetic Recording," Mar. 4, 1971.

*Primary Examiner*—Andrew J. James
*Assistant Examiner*—Viet Q. Nguyen
*Attorney, Agent, or Firm*—LaHive & Cockfield

[57] ABSTRACT

Computer timing apparatus enables two clock elements to produce a single stream of timing pulses, without interruption, when both elements are operating normally, and when one element fails. The apparatus incorporates a multi-stable stage and an output logic stage. The multi-stable stage detects state transitions in the input signals of each clock element and generates a corresponding clock-tracking signal which can disable the output of the corresponding clock from propagating through the output logic. The output logic stage logically combines each clock signal with its corresponding clock-tracking signal, and logically combines the resultant signal to produce a single stream of output signals responsive to a next transition produced by either of the two clock elements.

2 Claims, 2 Drawing Sheets

FAULT-TOLERANT DIGITAL TIMING APPARATUS AND METHOD

BACKGROUND OF THE INVENTION

This invention relates to computer timing apparatus and, more particularly, to apparatus and methods for providing highly reliable clock signals for operating digital data processing equipment and systems.

Digital computer equipment commonly includes a clock device to produce timing pulses for synchronizing and sequencing operations. This invention provides such a clock device that operates without interruption in the event of certain faults.

Fault conditions are inevitable in digital computer systems, due in part to the number and complexity of components and circuits they employ. Computers have included redundant processor modules and redundant memory modules, for example, to continue operation in the event of module failure.

Similarly, fault conditions can occur in the digital clock devices which control the timing of digital computer equipment. Computer equipment employing prior art clock apparatus can become disabled by a single clock fault.

It has proven difficult, however, to provide redundancy for clock modules. It is accordingly an object of this invention to provide a clock apparatus and method which operates with improved tolerance to faults and hence with improved reliability.

It is a further object of the invention to provide a clock device having two clock elements, and which provides an uninterrupted stream of output clock pulses notwithstanding failure of either clock element.

Other general and specific objects of the invention will in part be obvious and will in part appear hereinafter.

SUMMARY OF THE INVENTION

Computer timing apparatus according to the invention enables two redundant clock elements to produce a single stream of timing pulses, without interruption, when both elements are operating normally and when one element fails so that only the other one is operating normally. Where even greater reliability is desired, the invention can be practiced with more than two clock elements. In such an expanded embodiment, a reliable stream of timing pulses is produced so long as any one clock element operates in each timing interval.

More particularly, computer clock apparatus according to the invention has at least first and second clock elements for producing respective first and second streams of clock input pulses. A comparator element compares pulses produced from the two clock elements, and detects state transitions in each of the two pulse streams. The apparatus further includes an output element responsive to the comparator element and in communication with the clock elements. The output element responds to the detection of a state transition to produce a clock output pulse representative of a next clock pulse produced by either clock element. As a result, the apparatus generates an uninterrupted clock output signal notwithstanding failure of any single clock element.

The invention thus makes it possible to increase the reliability against failure of clock elements, by the expedient of providing a logic circuit that combines the output pulse streams from redundant clock elements and responds to any one clock element, with substantially uninterrupted output timing.

The invention comprises steps and apparatus embodying features of construction, combinations of elements and arrangements of parts adapted to effect such steps, as exemplified in the following detailed disclosure, and the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENT

The invention, in one aspect, provides a circuit for testing plural timing signals, referred to as "strobe" signals, which may have different frequencies and duty cycles, and for generating a single output strobe signal from them. The invention will be described in connection with a reliable clock embodiment. However, it will be apparent to one skilled in the art that the invention can be embodied in a variety of structures and systems for testing and generating strobe signals.

Figure 1:
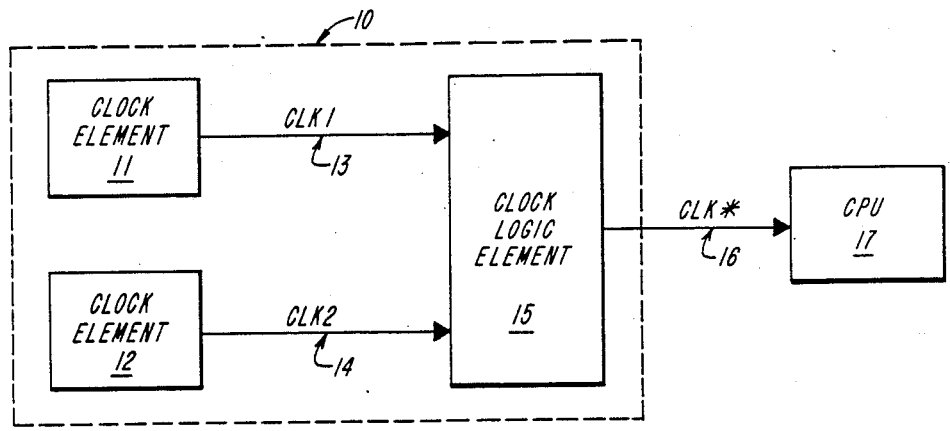
FIG. 1 is an electrical block diagram of a two-clock system in accordance with the invention.

A digital clock device 10 according to the invention has, as FIG. 1 shows, a first clock element 11, a second clock element 12, and a clock logic element 15. The clock logic element 15 receives an input stream of timing signals, referred to as CLK1, from the first clock element 11 over line 13, and receives a CLK2 input stream of timing signals from the second clock element 12 over line 14. Clock logic element 15 compares the CLK1 and CLK2 signals, in a manner more fully discussed hereinafter, and produces a stream of output clock Pulses, designated CLK*, which remains substantially uninterrupted notwithstanding failure of either clock element. The output clock pulse stream CLK*, carried on line 16, may be used to clock digital computer equipment such as a central processor unit 17 as disclosed in the above-mentioned U.S. Pat. No. 4,453,215.

Figure 2:
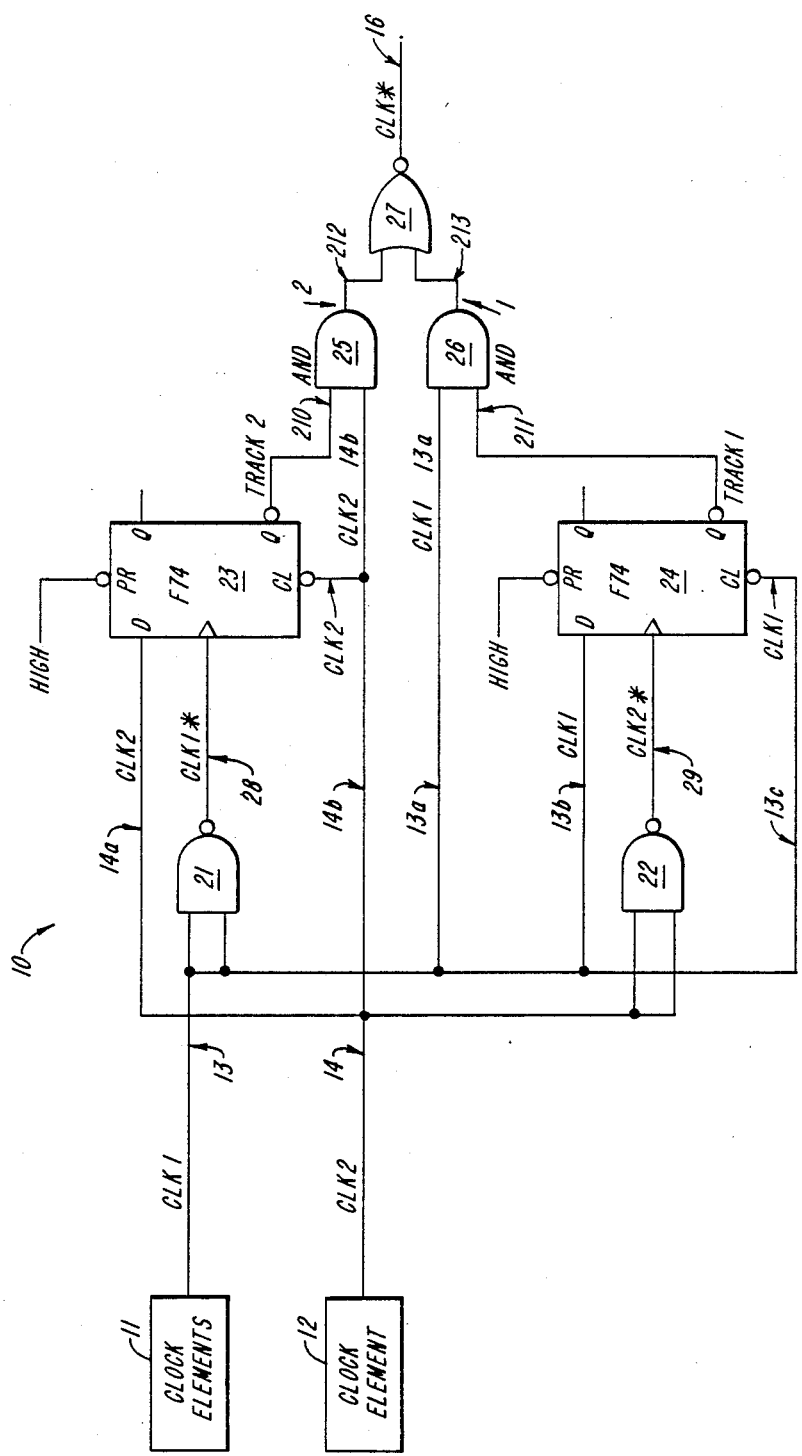
FIG. 2 is a schematic diagram of a preferred logic circuit for the system of FIG. 1.

FIG. 2 shows a logic circuit implementation of the two-clock system 10 of FIG. 1. The clock elements 11 and 12 normally generate streams of clock signals CLK1 and CLK2, respectively, carried on lines 13 and 14, respectively. Clock elements 11 and 12 may be constructed with oscillator circuits known in the art. The respective output signals CLK1 and CLK2 of clock elements 11 and 12 will therefore preferably consist of alternating high and low digital values. In a preferred embodiment of the invention, clock elements 11 and 12 are synchronized with one another and otherwise operate independently, and have identical frequency and hence identical clock rates. However, clock elements 11 and 12 can have different frequencies and different duty cycles, although, as discussed below, indeterminate operation may occur when one clock element produces a rising edge coincidentally or simultaneously with production of a falling edge by the other.

The circuit of FIG. 2 implements clock logic element 15 of FIG. 1 with an input section formed by NAND gates 21 and 22, an intermediate multi-stable section that employs two flip flops 23 and 24, and an output section that employs two AND gates 25 and 26 and a NOR gate 27. More particularly, NAND gate 21 is configured as an inverter, as known in the art. Both inputs of NAND gate 21 are driven by pulse stream CLK1 over line 13, and the output of NAND gate 21 is a CLK1* signal on line 28. The CLK1* signal is inverted and delayed with respect to the CLK1 signal. The delay is attributable to propagation delays through the NAND gate 21.

Similarly, NAND gate 22 inverts the CLK2 signal carried on line 14. The output CLK2* signal of NAND gate 22 is inverted and delayed with respect to the CLK2 signal, and is carried on line 29. The Propagation delay in NAND gate 22 preferably is nominally identical to the delay in NAND gate 21.

The illustrated flip-flops 23 and 24 are D-type flip-flops known in the art. The D input of flip-flop 23 is driven by the CLK2 signal over line 14a. The clock input of flip-flop 23 is driven by signal CLK1* over line 28, and flip-flop 23 is cleared by signal CLK2 over line 14b. The signal at the inverting Q output of flip-flop 23, referred to as TRACK2, is carried over line 210.

Similarly, the D input of flip-flop 24 is driven by signal CLK1 over line 13b, the clock input of flip-flop 24 is driven by signal CLK2* over line 29, and the flip-flop is cleared by signal CLK1 over line 13c. The signal at the inverting Q output of flip-flop 24, referred to as signal TRACK1, is carried over line 211.

AND gate 25 performs an AND operation with the TRACK2 and CLK2 signals, carried over lines 210 and 14b, respectively. The output of AND gate 25, referred to as signal AND2, is carried over line 212. AND gate 26 similarly performs an AND operation with the TRACK1 and CLK1 signals, carried over lines 211 and 13a, respectively. The output of AND gate 26, referred to as signal AND1, is carried over line 213.

NOR gate 27 performs a NOR operation with the AND1 and AND2 signals. The output signal from the NOR gate 27, referred to as signal CLK*, is the output of the two-clock device and is carried over line 16. Flip flops 23 and 24, AND gates 25 and 26, and NOR gate 27 operate with nominally identical propagation delays. The nominal propagation delays of the components are such that the CLK1 and CLK2 signals normally propagate through the AND and NOR gates of the output section with a cumulative delay less than that presented by the inverter and flip flop stages. In order to ensure proper circuit function, the total propagation delay of NOR gate 27 and of either AND gate 25 or 26 is to be less than the total propagation delay of inverter 21 and flip flop 23, and of inverter 22 and flip flop 24

In operation, the circuit of FIG. 2 generates a rising edge in signal CLK* whenever both signal CLK1 and signal CLK2 fall. Conversely, the circuit generates a falling edge in signal CLK* whenever both signal CLK1 and signal CLK2 rise. If one clock element fails to generate a rising or falling edge, the circuit generates a state transition at the CLK* output in response to the next rising or falling edge produced by the remaining operational clock element. The output in such a case may be delayed with respect to the input. The delay is attributable to propagation time through the flip-flops. The frequency of the resultant CLK* signal thus is invariant, so long as one clock element produces a state transition in the proper time interval. The exact transition times of the CLK* signal may exhibit minor propagation delays, due to the operating conditions of the clock elements, and the frequency is substantially stable.

The multi-stable stage consisting of flip flops 23 and 24 detects upward and downward state transitions in the clock output signals CLK1 and CLK2, and disables the output of a failed clock element from propagating through the AND gates 25 and 26 of the output stage. The operation of the multi-stable section is described in greater detail below in connection with Table I.

Table I summarizes the operation of the two-clock system of FIG. 2 for eight successive timing intervals, commencing at times $t_0$, $t_1$, $t_2$, ... $t_7$. Table I illustrates a sequence in which the two clock elements operate properly except in Intervals Three and Seven.

TABLE I

| Interval | CLK1 | CLK2 | TRACK 1 | TRACK 2 | AND1 [= CLK1 AND TRACK 1] | AND2 [= CLK2 AND TRACK 2] | CLK* [= AND1 NOR AND2] |
|---|---|---|---|---|---|---|---|
| 0 | 0 | 0 | 1 | 1 | 0 | 0 | 1 |
| 1 | 1 | 1 | 1 | 1 | 1 | 1 | 0 |
| 2 | 0 | 0 | 1 | 1 | 0 | 0 | 1 |
| 3 | 1 | 0 | 1 | 1 | 1 | 0 | 0 |
| 4 | 0 | 0 | 1 | 1 | 0 | 0 | 1 |
| 5 | 1 | 1 | 1 | 1 | 1 | 1 | 0 |
| 6 | 1 | 0 | 0 | 1 | 0 | 0 | 1 |
| 7 | 1 | 1 | 0 | 1 | 0 | 1 | 0 |

Intervals Zero, One and Two of Table I represent normal operation of the two clock elements 11 and 12 as do intervals Four and Five, as discussed below.

Examination of Table I in conjunction with FIG. 2 shows that the output signal CLK* is a function of the digital values of signals AND1 and AND2, and in turn, that signals AND1 and AND2 result from AND operations performed on signals CLK1 and TRACK1, and CLK2 and TRACK2, respectively. The operation of the circuit of FIG. 2 is thus best described in terms of the values of the AND, TRACK, and CLK signals at each interval shown in Table I.

At interval Zero, clock elements 11 and 12 generate signals CLK1 and CLK2 having a value of logic ZERO. A logic ZERO is therefore asserted at the CLEAR inputs of both flip-flops 23 and 24. Asserting a logic ZERO at the CLEAR input of a D-type flip-flop forces an output of logic ONE at the inverting Q output. Hence at interval Zero, signals TRACK1 and TRACK2, which are generated at the inverting Q outputs of flip-flops 24 and 23, respectively, both have a value of logic ONE.

The signal AND1, which is generated by the AND operation performed by AND gate 26 on signals CLK1 and TRACK1, is a logic ZERO unless both CLK1 and TRACK1 are logic ONE. Similarly, signal AND2, which is generated by the AND operation performed by AND gate 25 on signals CLK2 and TRACK2, is logic ZERO unless both CLK2 and TRACK2 are logic ONE. Thus, in interval Zero, because both TRACK1 and TRACK2 are logic ZERO, the AND1 and AND2 signals each have a value of logic ZERO.

The output signal CLK*, which is the result of the NOR operation performed by NOR gate 27 on signals AND1 and AND2, is a logic ZERO unless both AND1 and AND2 are logic ZERO. As described above, signals AND1 and AND2 have a value of logic ZERO in interval Zero, and accordingly, output signal CLK* is logic ONE in interval Zero.

In interval One, clock elements 11 and 12 continue to operate normally, each rising to logic ONE. Because logic ONEs are thereby asserted at the CLEAR inputs of the D-type flip-flops 23 and 24, the flip-flops are enabled for clocked operation. Flip-flops 23 and 24 are clocked by signals CLK1* and CLK2* respectively, which are inverted with respect to CLK1 and CLK2, respectively. Because a rising edge is generated in signals CLK1 and CLK2 in interval One, a falling edge is asserted at the clock inputs of flip-flops 23 and 24 in interval One. Flip-flops 23 and 24 are, as indicated in schematic form by FIG. 2, rising edge flip-flops, which change state only when signals CLK1* and CLK2*, respectively, rise from logic ZERO to logic ONE. Accordingly, in interval One, flip-flops 23 and 24 do not change state, and signals TRACK1 and TRACK2 each remain at logic ONE.

Because signals CLK1, CLK2, TRACK1 and TRACK2 all are logic ONE during interval One, signals AND1 and AND2 are logic ONE, and signal CLK* is logic ZERO during this interval.

During interval Two, clock elements 11 and 12 continue to operate normally, each falling to logic ZERO. Because logic ZEROs are therefore asserted at the CLEAR inputs of flip-flops 23 and 24, signals TRACK1 and TRACK2 are forced to logic ONE, as discussed above. Because signals CLK1 and CLK2 fall to logic ZERO, signals AND1 and AND2 accordingly fall to logic ZERO, and signal CLK* rises to logic ONE.

In Interval Three, signal CLK2 displays a fault condition in that it remains at logic ZERO, rather than rising to logic One.

A logic ZERO is thus asserted at the CLEAR input of flip-flop 23, forcing output signal TRACK2 to logic ONE. Because signal CLK1 is at logic ONE, a logic ONE is asserted at the CLEAR input of flip-flop 24, setting flip-flop 24 for clocked operation. However, signal CLK2*, which is inverted with respect to signal CLK2, was logic ONE in interval Two, and continues to be at logic ONE in interval Three. Because flip-flop 24 only changes state when a rising edge is applied to its clock input, flip-flop 24 does not change state, and signal TRACK1 continues to have a value of logic ONE.

Accordingly, signal AND1, which is the result of the AND operation performed by gate 26 on signals CLK1 and TRACK1, is logic ONE during interval Three. Signal AND2, which is the result of the AND operation performed by gate 25 on signals CLK2 and TRACK2, is logic ZERO during this interval. Output signal CLK*, which is the result of the NOR operation performed by gate 27 on signals AND1 and AND2, therefore switches to logic ZERO during this interval.

Intervals Four and Five again illustrate normal operation of the two clock elements. In Interval Six of Table I, however, clock element 11 fails to generate a logic ZERO and the CLK1 signal remains at logic ONE.

Because signal CLK1 has a value of logic ONE, a logic ONE is asserted at the CLEAR input of flip-flop 24, which enables flip-flop 24 for clocked operation. CLK2*, which is inverted with respect to CLK2, rises to logic ONE when CLK2 falls to logic ZERO. When the CLK2* rising edge is asserted at the clock input of flip-flop 24, signal TRACK1 at the inverting Q output of flip-flop 24 becomes the complement of what the value at the D input of flip-flop 24 was before the rising edge was asserted. CLK1, at the D input, is a logic ONE during this prior interval, and TRACK1 accordingly falls to logic ZERO during interval Six.

Signal TRACK2 remains at logic ONE during interval Six, because the logic ZERO in signal CLK2, which is asserted at the CLEAR input of flip-flop 23, forces a logic ONE at the inverting Q output of flip-flop 23.

The signal AND1, which is the output of the AND operation which gate 26 performs with TRACK 1 and CLK1 signals, falls to logic ZERO. Signal AND2 also falls to logic ZERO. The CLK* signal output from the NOR gate 27 follows the falling edge of CLK2 and rises to a logic ONE, thereby maintaining an uninterrupted stream of clock pulses during interval Six.

Interval Six in Table I shows that, because AND gate 26 of the output stage will only transmit a logic ONE if both TRACK1 and CLK1 are logic ONE, the TRACK1 signal generated by flip-flop 24 disables a logic ONE output of clock element 11 from propagating through AND gate 26 when clock element 11 fails to properly generate a logic ZERO.

During interval Seven, signal CLK1 remains at logic ONE, and signal CLK2 rises to logic ONE. TRACK1 remains at logic ZERO, because while flip-flop 24 is set for clocked operation by the logic ONE value of signal CLK1, signal CLK2*, which clocks flip-flop 24, falls from logic ONE to logic ZERO, and flip-flop 24 therefore does not change state. Signal TRACK2 remains at logic ONE, because while flip-flop 23 is set for clocked operation by the logic ONE value of signal CLK2, signal CLK1*, which clocks flip-flop 23, remains at logic ZERO. Flip-flop 23 therefore does not change state.

Figure 3:
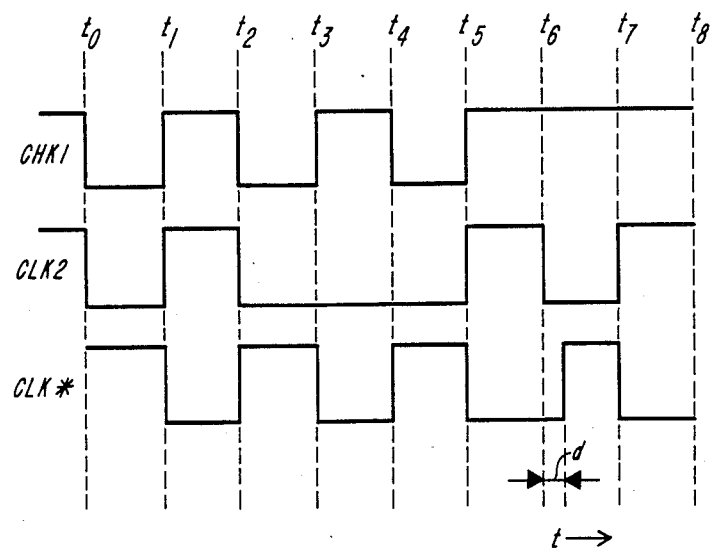
FIG. 3 is a timing diagrams illustrating operation of the two-clock system of FIG. 2.

FIG. 3 shows a set of digital timing diagrams for the CLK1, CLK2 and CLK* signals during the timing intervals shown in Table I. The CLK1 wave form in FIG. 3 shows, for example, that at time $t_3$, corresponding to the start of Interval Three of Table I, clock element 12 fails to generate a rising edge. Clock element 11, which continues to operate, generates a rising edge. Signal TRACK1 remains at logic ONE, because although flip-flop 24 is set for clocked operation by the logic ONE of signal CLK1, signal CLK2*, which clocks flip-flop 24, remains at logic ONE. Flip-flop 24 hence does not change state. Signal TRACK2 is forced to logic ONE by the logic ZERO of signal CLK2, which is applied to the CLEAR input of flip-flop 23. Accordingly, signals AND1 and AND2 are logic ONE and ZERO, respectively, during this interval. CLK*, the result of a NOR operation on AND1 and AND2, is thus switched to logic ZERO.

Similarly, at time $t_5$, after transmitting three logic ONES, clock element 11 fails to fall to logic ZERO. Clock element 12, which continues to operate, generates a falling edge. The logic ZERO in CLK2 forces signal TRACK1 to logic ONE, while signal CLK2* clocks flip-flop 24, generating a logic ZERO in signal TRACK1. The logic ZERO in signal TRACK1 forces signal AND1 to logic ZERO, and the logic ZERO in signal CLK2 forces signal AND2 to logic ZERO. Thus, output signal CLK*, which is the result of a NOR operation on signals AND1 and AND2, rises to logic ONE.

The delay, designated "d," which is shown in exaggerated form at time $t_6$, represents propagation delays characteristic of the flip-flop TTL stages. No such delay is indicated in signal CLK* during the fault condition at time $t_3$, because at time $t_3$, the rising edge in signal CLK1 triggers the falling edge in signal CLK* directly through gates 26 and 27.

In a preferred embodiment of the invention, the two input clock elements 11 and 12 normally operate in lock-step synchronism. This normal operating mode is illustrated in Table I at Intervals Zero-Three and Four and Five. Those skilled in the art will understand that the two clocks can be operated substantially in phase by simply starting the two equal-frequency clocks simultaneously. One alternative is to use an analog circuit known in the art to synchronize the clock pulses. Both methods of operating two clocks elements in phase are known in the art, and are within the ambit of the invention.

The examples of Table I and FIG. 3 demonstrate that the illustrated circuit maintains an uninterrupted output of timing pulses as long as one input strobe or clock element continues to operate, by switching in each timing interval. The configuration of gates 21, 22, 25-27 and flip flops 23 and 24 illustrated in FIG. 2 provides a logic section which compares input pulses from plural strobe or clock elements and generates a stream of output pulses. Each output pulse is representative of the next input pulse transition produced by any of the plural input clock elements.

One feature of the invention is that so long as the clock elements operate with timing phases which are within 180 degrees of each other, the output signal from the device which the invention provides switches from ONE to ZERO in response to all inputs rising. Further, if all inputs do not rise, the output signal of the device switches from ONE to ZERO in response to the first rising edge which occurs at the input stage. The output signal switches from ONE to ZERO in response to all inputs falling or, if all inputs do not fall, in response to the first falling edge which occurs at the input stage.

The clock device is subject to fault only if the input clock elements are at least 180 degrees out of phase, for then the logic circuitry may be unable to provide an uninterrupted output of regular clock pulses. When the clock elements are 180 degrees out of phase, a rising edge and a falling edge are simultaneously asserted at the input stage of the circuit. A race condition results, and the output of the circuit is indeterminate, depending on small delays within the gates.

The illustrated circuit can be used with strobe or clock inputs having different duty cycles and different frequencies. The circuit produces a reliable output pulse stream, as long as the strobe or clock inputs do not simultaneously generate a rising and a falling edge. Such a condition of coincident opposite input transitions may occur, for example, if the strobe or clock input devices are in a "beat" condition, in which the frequency of one input device differs slightly from the frequency of another input device. The input devices then "race" each other until one device generates a rising edge and the other device simultaneously generates a falling edge.

Subject to this constraint of avoiding simultaneous assertion of rising and falling edges at the input of the circuit, the circuit need not be driven with "clock" inputs having exacting control of frequency and duty cycle, but may instead be driven by "strobe" inputs, having less regular pulse outputs.

In a preferred embodiment of the invention, logic gates 25, 26 and 27 are provided by a single component known as an AND OR INVERT (AOI) device. An AOI is preferred over three separate gate devices because the single AOI increases switching speed and reliability.

The illustrated implementation of the circuit can be utilized with pulse widths as low as 15 nanoseconds, with 60-100 nanosecond pulse widths and 4 megahertz frequencies being typical.

Additionally, the illustrated circuit can be expanded to use three strobe or clock inputs. Each strobe or clock input is checked by a multi-stable stage, and its output is enabled or disabled from propagating through an AOI logic output stage, as described above in connection with the illustrated circuit. Such a plural clock circuit according to the invention may bear passing resemblance to prior art "voting" circuits which provide an output signal based on the values at a majority of plural inputs. However, prior art voting circuits do not generate an uninterrupted timing pulse output when only a single input strobe element is functioning.

Moreover, the Boolean complement of the illustrated circuit, in which flip-flops 23 and 24 are triggered by falling edges rather than rising edges, will be obvious to those skilled in the art.

It will thus be seen that the invention efficiently attains the objects set forth above, among those made apparent from the preceding description. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A digital logic circuit for generating a reliable serial stream of clock output pulses from first and second digital input clocks, said circuit comprising:
   A. first and second input means for receiving clock input pulses produced from said first and second clocks respectively,
   B. first bi-stable logic means associated with said first input means, for storing a first digital value received at said first input means and selectively transmitting, responsive to pulses received at said second input means, said first digital value or a complementary digital value of said first digital value,
   C. second bi-stable logic means associated with said second input means, for storing a second digital value received at said second input means and selectively transmitting, responsive to pulses received at said first input means, said second digital value or a complementary digital value of said second digital value, D. output logic means, connected with said first and second input means and with said first and second bi-stable logic means, for (i) comparing pulses from said first and second input means, and from said first and second bi-stable logic means, and (ii) producing a clock output pulse in response to a next clock input pulse received at either of said input means, so that an uninterrupted clock pulse output is produced notwithstanding failure of any single one of said input clocks.

2. Computer timing apparatus for producing a single stream of timing pulses continually when at least any one of first and second input sequences of timing signals are present, said apparatus comprising A. multi-stable binary logic means for receiving said first and second input sequences of timing signals and for producing, in response thereto, first and second sequences of clock-tracking signals, each sequence of clock-tracking signals being responsive to occurrence of a transition in at least one input sequence of timing signals, and B. output logic means for logically combining each input sequence of timing signals with its corresponding clock-tracking signal to generate a corresponding resultant signal, and for logically combining the resultant signals to produce a single stream of output signals responsive to a next transition in any of said first and second input sequences of timing signals.

* * * * *